Feb. 6, 1934.                T. L. FAWICK                1,946,154
                       TRANSMISSION FOR AUTOMOBILES
                     Filed Sept. 26, 1924    6 Sheets-Sheet 2
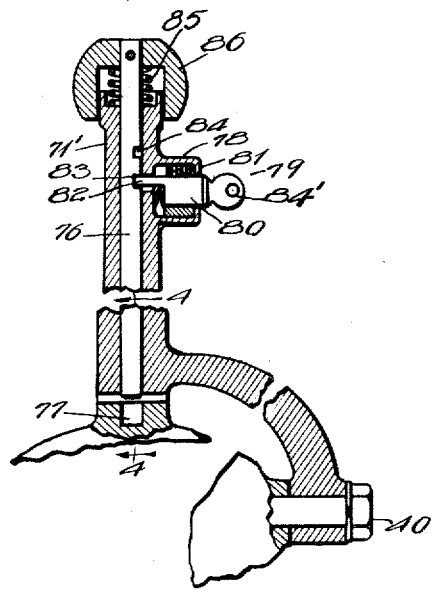
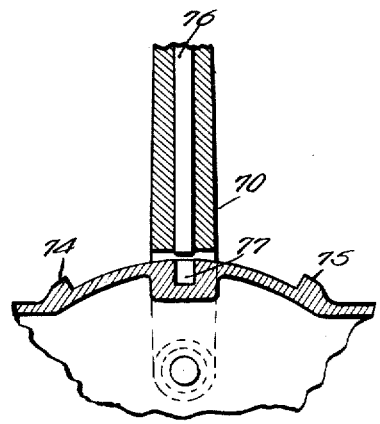
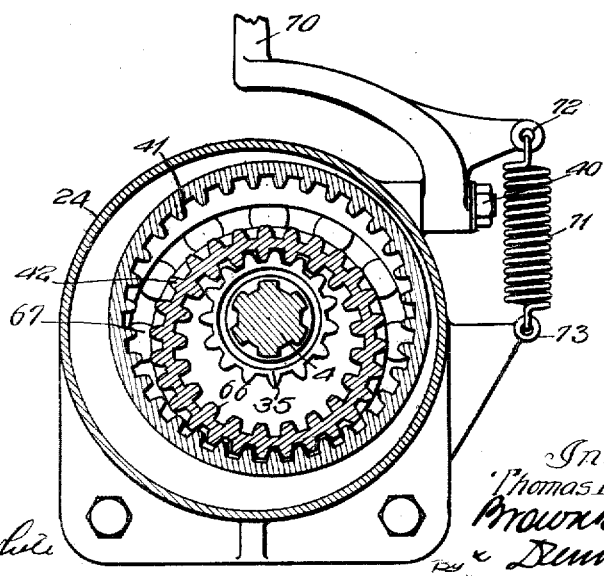

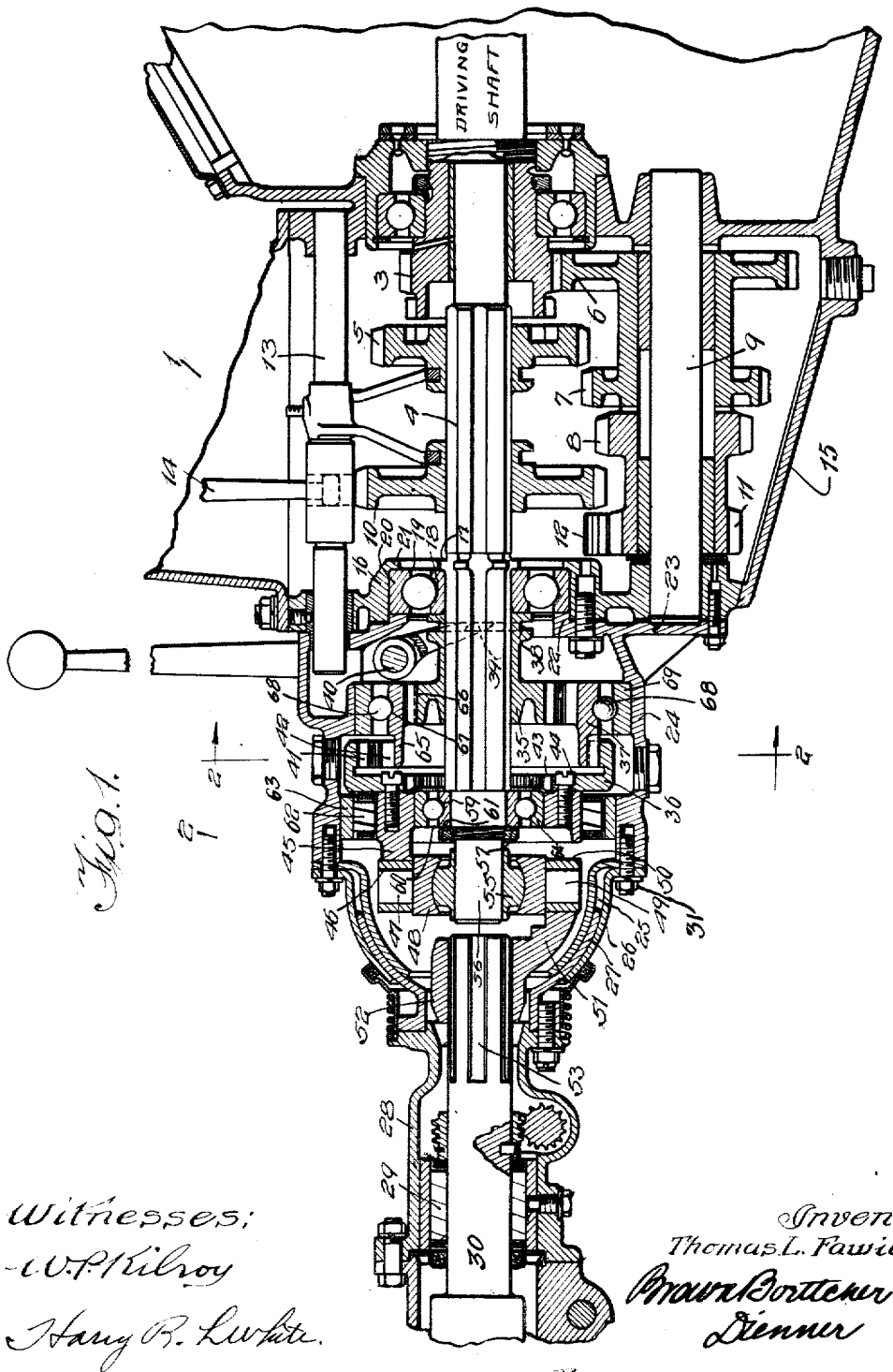

Feb. 6, 1934.                T. L. FAWICK                  1,946,154
                      TRANSMISSION FOR AUTOMOBILES
                  Filed Sept. 26, 1924      6 Sheets-Sheet 3

Feb. 6, 1934. T. L. FAWICK 1,946,154
TRANSMISSION FOR AUTOMOBILES
Filed Sept. 26, 1924 6 Sheets-Sheet 4

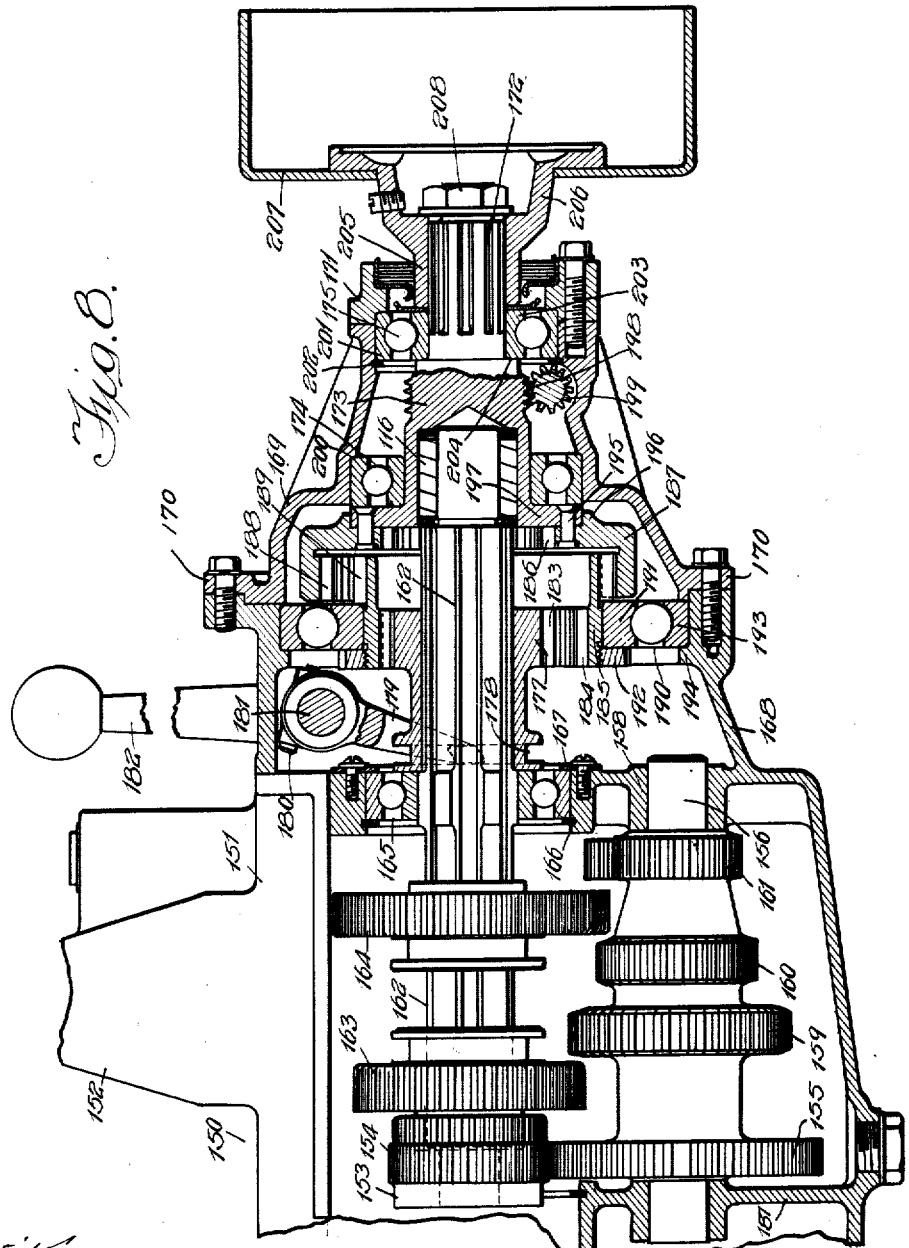

Feb. 6, 1934.  T. L. FAWICK  1,946,154
TRANSMISSION FOR AUTOMOBILES
Filed Sept. 26, 1924   6 Sheets-Sheet 6

Patented Feb. 6, 1934

1,946,154

UNITED STATES PATENT OFFICE 1,946,154

TRANSMISSION FOR AUTOMOBILES

Thomas L. Fawick, Racine, Wis., assignor to Brown-Lipe Gear Company, Syracuse, N. Y., a corporation of New York Application September 26, 1924
Serial No. 739,999

20 Claims. (Cl. 74—57)

My present invention relates to transmissions for automobiles and the like and more particularly it is an improvement upon the transmission disclosed in my Reissue Patent No. 18,629, granted October 18, 1932, which provides a supplementary gearing upon the rear end of the usual accelerating and reverse transmission which supplementary consists of internally meshing gears.

The present gearing is of the class which provides selective speed ranges through the use of a pinion and internal gear which are clutched together for direct drive or are connected together for a different driving ratio as shown in my prior Patent No. 1,495,782 of May 27, 1924.

Whereas, the shift from direct drive to a gear ratio or vice versa in said prior patent is obtained by a swinging carriage which shifts a section of the driven shaft laterally to bring the gear carried thereby into alignment with the relatively stationary gear, I have found that the two shafts may be held in suitable bearings permanently in alignment and that the feature of an internal drive may be preserved and the shift from one drive to another be secured by a simple axial or plunging movement of one of the co-operating parts, preferably the pinion.

In carrying out this general purpose of securing the shift by axial movement of one of the parts only, I employ an idler ring having a set of external teeth and a set of internal teeth. The external teeth are arranged on a pitch circle which is tangent with the pitch circle of the internal gear. In the preferred form of my invention, the external teeth of the ring gear and the internal teeth of the internal gear are in constant mesh. The ring gear has a set of internal teeth arranged on a pitch circle tangent with the pitch circle of the pinion.

The internal gear has in addition to its aforesaid gear teeth an axial socket or a clutch member adapted to be engaged by the pinion or a suitable part of the same when the pinion is shifted axially out of mesh with the internal teeth of the ring and into engagement with the clutch socket.

I have studied the construction sufficiently to find out that the relation of the parts may be reversed, that is to say, first either the pinion or the internal gear may be the driving or the driven member as may be desired, and next, instead of shifting the pinion and clutch members I may shift the internal gear and clutch member instead. It will be observed that the internal gear and clutch member has the two functions, namely, direct clutching and driving through a ratio and in like manner the pinion has two functions, namely, direct clutching and driving through a gear ratio. While I have shown the internal gear with a socket into which the pinion may be plunged, the teeth of the pinion serving as jaws of the clutch, it is not necessary to employ the pinion teeth as clutch jaws since separate clutch teeth may be provided on the pinion and on the internal gear for the clutching function as distinguished from the rolling function which the gear teeth primarily have.

In connection with the above, I find that it is possible to telescope the universal joint in the propeller shaft with the driven element of my speed range gear. This saves considerable material and reduces the space requirement very materially. At the same time it permits ample bearing provision to be made for supporting the said driven element and for supporting the universal joint. Such a construction is particularly useful in connection with a drive employing a torque tube.

Since the two shafts, driving and driven, are held in fixed alignment, they may be firmly supported and the pinion may be shifted out of mesh with the idler and into mesh with the clutch socket in the internal gear by a straight axial motion. This permits me to shift the speed range gear by means of the same shift lever which controls the accelerating and reverse gearing.

Due to the fact that only internally meshing drives are involved and due to the fact that the gear reduction is cut in two, the relative speed between the teeth of the gears is very low with consequent great strength and quietness to a marked degree.

I wish to have it understood that the present invention is not limited to the placing of the speed range gear back of the accelerating transmission, as by the development of the present form it is possible to place the speed range gearing between the clutch of the motor and the accelerating and reverse gears, particularly in a structure such as the Studebaker car, where the gear box is separate from the usual bell housing on the rear of the motor. In such constructions, my speed range gear may be conveniently inserted between those parts as a separate unit or merged with one or the other as may be desired. For example, the speed range gear may be enclosed in the rear part of the bell housing and hence supported by the motor directly back of the fly wheel. It may even be mounted on the rear axle.

Now, in order to acquaint those skilled in the art with the manner of constructing and operating a device in accordance with my invention, I have in the accompanying drawings, illustrated three forms of transmissions embodying my invention, first, a transmission for the Lincoln car, next, a transmission for the Ford car and, third, a transmission for the Chrysler car. The first two embodiments illustrate the use of the torque tube, the one being in connection with the well known Ford planetary transmission, the second also employing the torque tube in connection with a sliding gear transmission and the third employing a jointed propeller shaft in accordance with the principles of the Hotchkiss drive and being used in combination with the Chrysler sliding gear accelerating and reverse transmission.

In the accompanying drawings:

Fig. 1 is a longitudinal vertical section through a compound transmission suitable for the Lincoln automobile and embodying my invention;

Fig. 2 is a rear elevational view showing the manner of mounting the gear shift lever;

Fig. 3 is a modified form of gear shift lever for locking the speed range transmission of Figs. 1 and 2 in neutral position;

Fig. 4 is a fragmentary sectional view taken on the line 4—4 of Fig. 3 indicating the stops for the operating lever to take the spring pressure off of the shifter fork;

Fig. 5 is a vertical longitudinal section through a speed range transmission combined with the usual accelerating and reverse transmission of the Ford automobile;

Fig. 8 is a vertical horizontal section through a compound gear of my invention for use on the Chrysler automobile; and Fig. 9 is a view like Fig. 5 of a modification.

Figure 6:
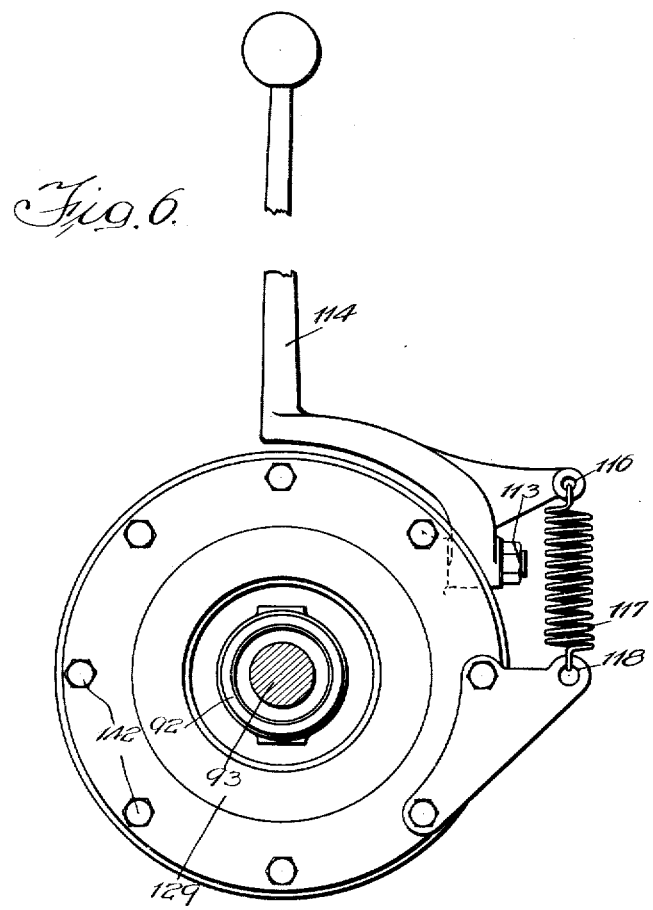
Fig. 6 is a rear end view of the transmission shown in Fig. 5.

The compound transmission shown in Fig. 1 comprises the accelerating and reverse transmission 1 and the speed range transmission 2, all united in a rigid unitary structure in accordance with the teachings of my Reissue Patent No. 18,629, above referred to. The accelerating and reverse transmission includes a driving shaft connected to the driving pinion 3, this driving shaft being connected by a suitable clutch to the engine shaft and lying axially in line with the intermediate shaft 4 to which it is adapted to be clutched by means of the gear and clutch member 5 directly, or to be connected through a suitable reduction as by means of the co-operating gears 6, 7 and 8, upon the lay shaft 9 and the shiftable gear 10 on the intermediate shaft section 4. Suitable reverse is secured through the pinion 11, idler 12 and gear 10, as is well understood by those skilled in the art. The shiftable gear and clutch member 5 is controlled by a suitable shifter fork (not shown) such fork being mounted upon the shifter shaft 13 and being adapted to be moved by the usual gear shift lever 14 having the well known movement in a path corresponding to the letter H. In a similar manner the shiftable gear 10 which is also mounted on the intermediate shaft 4, is adapted to be shifted by a shifter fork mounted on a similar shifter shaft and controlled by the same shift lever 14, all as is well understood by those skilled in the art. The shifter handle 14 may be employed for operating the speed range gear 2.

The intermediate shaft 4 is splined throughout the major part of its length for the shiftable members 5 and 10 at the forward end, and for the shiftable pinion and clutch member, later to be described, at its rear end. At its forward end the shaft 4 is gained into the end of the driving shaft (not shown) as is well understood by those skilled in the art, to secure a suitable guiding and bearing support for said end of the shaft. The accelerating and reverse transmission is housed in a suitable housing, part of which is shown at 15, this housing including the end wall 16 forming a support first for the shifter rod 13 and next for the shafts 4 and 9 and the idler 12. The intermediate shaft 4 has a shoulder formed thereon at 17 for engaging the end of the inner bearing race 18 of the bearing 19. The outer race 20 is set in a recessed bore formed in the end wall 16 and seats against a shoulder 21 on the inside and is engaged by a shoulder 22 formed as a part of the end wall 23 of the supplementary housing 24 which supplementary housing encloses the speed range gear 2.

Inner and outer spherical hub members generated on a common radius, provide between them room for the spherical bell member 27 which forms the forward end of the torque tube of the well known Lincoln construction. The bell member 27 is flanged and connected to the member 28, which provides a bearing at 29 for the forward end of the propeller shaft 30. The cup members 26 and 25 have flat flanges which are bolted to the end of the housing 24, as by means of the studs 31.

Motion is transmitted from the intermediate shaft 4 through the medium of the pinion and clutch member 35 which is flanged upon the extension of the shaft 4 lying within said housing 24 and either directly to the internal gear and clutch member 36 when the two parts are clutched together, or through a gear reduction through the ring gear member 37.

The pinion and clutch member 35 has a hub 38 providing a suitable collar groove in which lie the ends of a shifter fork 39 which shifter fork is secured upon a rock shaft 40 journalled in the housing 24 above and transversely to the shaft 4.

The internal gear and clutch member 36 has the gear teeth 41 adapted for rolling contact with the teeth 42 of the ring gear member 37 and it has the clutch teeth 43 of the same pitch and diameter as the teeth of the pinion 35. This gear and clutch member 36 is fastened, as by means of the screws 44, to a driven member 45, which performs both the function of a hollow shaft, a bearing, and a part of a universal joint. For my purposes, I will call it a driven shaft section since its primary purpose is to receive the power from the internal gear and clutch member 36 and to transmit it to the universal joint. In the present case, the member 45 has extensions at diametrically opposite points to which are secured the bearing members 46 which receive the diametrically opposite pins 47 of the ring member 48 of the universal joint. At right angles to the pins 47 there are arranged the pins 49 which have bearing members 50 connected at the ends of the arms 51 of the universal joint fork member 52, this fork member having a hub which is keyed to the forward end of the propeller shaft 30 through the means of the splines 53.

The ring member 48 has a central spherical socket forming a bearing for the spherical bronze bushing 55 which is inserted edgewise into the socket and then turned into the position shown.

This bearing bushing 55 is made of any suitable bearing metal, preferably bronze. It has a central cylindrical bore for receiving the cylindrical reduced end 56 of the intermediate shaft 4 and provides a suitable radial bearing therefor. Thus the driven shaft section 45 receives support at its front end through the bearings 62 upon the housing 24 and at its rear end upon the shaft 4 through the bearing 55. The relative motion between the shaft 4 and shaft 45 is at most only the amount of reduction received between pinion 35 and gear 36 and when these parts are clutched together, the only motion on the bushing 55 is a rocking or transverse movement, occasioned by the action of the universal joint. The nut 57 holds the inner race ring 59 of the bearing 60 between it and a shoulder 61 on said intermediate shaft 4. The shaft member 45 has direct radial support through the bearing rollers 62 which run in an outer race 63 mounted concentrically in the housing 24 on the axis of the shaft 4.

Now, assuming that the internal gear and clutch member 36 is rotated, it will be seen that it has its radial support in the roller bearings 62 and the outer race 63 and support against tilting on the end of the shaft 4 through the intermediary of the special bearing 55. The shaft 4 has a main radial support in the bearings 19 which are set in the rear wall of the transmission 1, and it has further radial bearing through the bearing 60, the outer race of which is secured, as indicated at 64, inside of the shaft section 45.

The bearings 55 and 60 are not subjected to any great duty because the speed of rotation of the shaft 4 with respect to the driven shaft section 45 or the propeller shaft 53 is relatively low, as will appear from the fact that these bearings need to take up the motion of the different speeds between these parts only.

The ring gear 37 has the laterally extending flange 65 bearing the gear teeth 42 and it has internal gear teeth 66 adapted to mesh and be driven by the teeth of the pinion 35. The main body of the ring gear 37 has a bearing groove 67 formed therein for receiving the ball bearings 68, the outer race 69 for which is mounted eccentrically in the housing 24.

The ring gear 37 is mounted eccentrically and is so proportioned that the pitch circle of the teeth 66 is tangent to the pitch circle of the teeth of the pinion member 35 and, at the same time, the pitch circle of the external teeth 42 is tangent to the pitch circle of internal teeth 41 of the internal gear member 36. The ring gear 37 is stationary to the extent that it is not shiftable and it is constantly in mesh with the internal gear member 36, preferably, but not necessarily at a point opposite the tangency of the point of tangency of the pinion 35 and internal teeth 66. It is necessary for the point of tangency to be diametrically opposite, in case it is desired to clutch the pinion and the internal gear 36 together directly and axially as in the structure illustrated.

The ring gear 37 performs the functions of a counter shaft but performs it in a highly advantageous and novel manner.

The complete gear reduction between the shaft 4 and the shaft member 45 is thus secured in two stages, the first reduction in the case illustrated being of the order of 14.25% and the second reduction in the case illustrated, being of the order of 10%. The total reduction, therefore, is the product of the two reductions and is of the order of 22.75%. For example, assume that the pinion 35 has 18 teeth and that the ring gear has internal teeth 21 in number. This gives a 14.25% reduction. The external teeth 42 of the ring member 37 may, for example, have 27 teeth and the internal gear member 36 may have 30 teeth, giving a 10% reduction. Since these reductions are in each case relatively small, the relative speeds of the gear teeth in meshing with each other is relatively low with consequent great strength and quietness and providing also a compact and powerful structure.

The rock shaft 40 is connected to a lever 70 and is controlled by a snap spring 71 connected above the center of the rock shaft 40 as indicated at 72 in Fig. 2 and below the rock shaft 40 as indicated at 73. The lever 70 is adapted to engage stops such as shown at 74 and 75 in Fig. 4 to relieve the shifter fork of the pressure of the spring after the shiftable member 35 has been thrown to one limit of its motion, or the other.

The operation of the device as illustrated, is as follows: The intermediate shaft 4, being driven either directly by the engine shaft or a continuation of the same, or through the accelerating and reverse gears, transmits motion to the pinion and clutch member 35 of the speed range gear. This pinion and clutch member serves, in the position shown in Fig. 1, purely as a pinion to transmit motion to the ring gear 37 which has internal teeth meshing with the teeth of the pinion and rotating in its independent bearings 68 to drive in turn through a gear reduction by means of the teeth 42 and 41. The internal gear member 36, which in the position of the parts shown in Fig. 1, serves purely as an internal gear member.

As heretofore explained, both the external pinion 35 and the internal gear 36 have a double function, first as regular gears and, next, as parts of a co-operating clutch. To this end the pinion 35 may be shifted first out of mesh with the teeth 66 of the ring gear 37 and then into mesh with the teeth 43 of the clutch portion of the gear 36. This motion of shifting from one position to the other may be performed either manually or through automatic gear shifting means, if desired. At all events, a very simple motion of rocking the shaft 40 is required and the use of the snap spring 71 is advantageous in this connection, although other suitable means for holding the shifted member 35 in either of its operating positions may be employed. The drive between the pinion 35 and the ring gear 37 has a support radially and endwise in the ball bearings 68. The reaction between the teeth 41 of the internal gear member 36 and the teeth 42 of the ring 37 is taken up between the bearings 68 and the bearings 62. These bearings are large in diameter and are adapted to sustain their load without difficulty. Naturally, the driven shaft section 45 could be brought down to a solid shaft if desired, but that would only lengthen the structure without securing sufficient compensating advantage. If the shaft section 45 were brought down to a solid shaft, it would furnish additional room for bearings and it would permit the end of the intermediate shaft 4 to be gained into the end of the same but I dispense with such lengthening of the shaft section 45 by gaining the intermediate shaft 4 into the end of the hollow shaft section 45 through the ball bearings 60. At the same time, I afford a support for the rear end of said shaft section 45 through the intermediary of the bearing 55 on the end of said intermediate shaft 4. As a result, the driven shaft section 45 is supported partly through the bearing 62 in the housing 24 and partly through the bearing 55 and the shaft 4.

The section which I have shown through the universal joint is taken on quarter instead of on a diameter in order to show the position of the coupling member 51 with respect to the ring 48.

In conjunction with the structure shown in Fig. 1, it is desirable to make the rear axle ratio of a character such that when the speed range gear is in direct drive, the speed of the engine is reduced for a given speed of the rear wheels. This permits better loading of the engine and higher speed of the vehicle. Obviously, if the drive were to be normally in direct and were to be stepped up by means of my gear, the relation of the parts would have to be reverse. It is more desirable to reduce the rear axle ratio and to carry a part of the ratio in the speed range gear for normal driving and then to clutch the driving shaft directly to the propeller shaft for the higher speed range.

I have shown in Figs. 3 and 4 how the speed range gear may be locked in neutral. This may be done by locking a shiftable member in neutral such as pinion 35, a shifter rod such as above described, rock shaft 40 or the controlling handle. To this end the lever 71' is provided with a central axial bore for receiving a locking rod 76 which rod is adapted to be projected from the lower end of the straight portion of the lever 71 into a suitable socket 77 formed on top of the housing 24.

An enlargement 78 is formed on the side of the lever 71' in an accessible position for the operator and in this enlargement there is housed a lock 79 comprising a rotatable barrel 80 and a stationary ring 81. The barrel 80 has a pin or extension 82 which is adapted to enter either one of the notches 83 and 84, as the case may be. The barrel 80 is adapted to be held in locking position through the use of suitable pin tumblers controlled by a key 84' and is also moved towards a position so that the pin 82 will lie in one of the notches by means of a spring 85.

When it is desired to lock the speed range gear in neutral, the handle is brought to the central position in register with the notch or hold 77, and the rod 76 is then unlocked by turning the barrel 80 and is plunged into the socket 77 by means of the head or knob 86 which is secured at its upper end and the locking barrel 80 is then released to permit the pin 82 to enter the notch 84. When the handle 71' is in intermediate position, the pinion member 35 is out of mesh with the teeth 66 on the ring gear 37 and is also out of mesh with clutch teeth 43.

It is to be noted that the plunger 76 must first be unlocked before it can be plunged and, furthermore, the handle must be moved to neutral position before the plunger and the notch 77 are in register.

In Figs. 5, 6, 7 and 9, I have shown an embodiment of my invention adapted for the Ford automobile. In this case, the usual Ford accelerating and reverse gear is indicated at 88 and the speed range gear is indicated at 89, the speed range gear being housed in a suitable housing 90, secured upon the rear end of the housing 91 for the accelerating and reverse gear. The housing 90 supports on its rear end the forward part of a universal joint in the torque tube which torque tube is indicated at 92 and which houses the propeller shaft 93.

I have indicated only sufficient of the Ford accelerating and reverse transmission to show the relation between the same and my speed range gear. The shaft 94 is connected to the engine shaft and is herein termed the driving shaft. It is connected through suitable reduction and reverse gearings, not shown, to the sleeve or hollow driving shaft 95 which I term herein the intermediate shaft, corresponding to the shaft 4 in the previous embodiment. Suitable clutch mechanism is indicated at 96 for clutching the shaft 94 directly to the shaft 95 for a direct drive, as is understood by those skilled in the art.

The housing or gear case 90 has a front end wall 97 in which is mounted a bearing 98 for supporting the intermediate shaft 95. The intermediate shaft 95 comprises the sleeve member shown at the left of the bearing 98 and an extension thereof 95' formed with suitable splines for mounting the shiftable pinion and clutch member 100, and formed also with a squared stud or stem 101 adapted to be driven into a broached socket in the end of the sleeve 95. A suitable portion between the splined part 95' and the stem 101 is cylindrical for mounting the inner race 102 of the bearing 98, the outer race 103 being seated in a suitable bore in the end wall 97.

The shiftable pinion and clutch member 100 has the gear teeth 104 which perform the dual function of gear teeth and clutch teeth. As gear teeth they mesh with the teeth 105 and transmit motion to the ring gear 106 which has also the external gear teeth 107 constantly in mesh with the gear teeth 108 of the gear and clutch member 110. The gear and clutch member 110 has a clutch socket employing the teeth 109 of the same pitch and diameter as the pinion 100, so that the pinion 100 may be slid out of mesh with the teeth 105 on the ring gear 106 and plunged into mesh with the teeth 109 on the internal gear and clutch member 110. The pinion 100 has a forwardly extending hub providing a shifter collar containing a groove 111 adapted to be engaged by a suitable shifter fork 112 which is mounted upon a rocking shaft 113. The rocking shaft 113 extends outside of the housing 90 and has a shifting lever 114 keyed thereto, this shifting lever having at its upper end the ball 115 and having intermediate its ends adjacent the rock shaft 113 a connection at 116 for the upper end of the snap spring 117. The lower end of the snap spring is connected to a bracket 118 secured to the housing 90. Through this snap spring 117 the pinion member 100 is adapted to be thrown into either one of its extreme positions, a suitable stop (not shown), being provided for keeping the spring tension from pressing the shifter fork against the sides of the groove 111.

The ring gear member 106 is mounted eccentrically with respect to the axis of the shafts 95 and 95'. It has a bearing groove 119 formed in its outer peripheral surface for receiving the ball bearings 120 which run in an outer race 121 mounted in an eccentric bore in the housing 90. The ring gear 106 is so proportioned and mounted that the pitch circle of its internal teeth 115 is tangent at the top with the pitch circle of the pinion teeth 104. At the same time the external teeth 107 of the ring gear 106 are tangent with the pitch circle of the internal gear teeth 108 on the member 110. The result is a gear reduction, as explained in connection with Fig. 1, in two stages.

In the form which I have shown, I have provided a gear reduction of 38.55%. This is secured, for example, by meshing the pinion 100 with 14 teeth and the ring gear 106 with 19 internal teeth, cooperating therewith. The external teeth of the ring gear 119 are made 25 in number and the cooperating internal teeth of the gear 110 are made 30 in number.

Thus, there may be a gear reduction of 38.55% or a direct drive in the structure shown.

The internal gear and clutch member 110 is connected to a tubular driven member 122 which I shall term herein the driven shaft section since it corresponds to the member 45 shown in Fig. 1.

The driven shaft section 122 is journalled by a cylindrical bearing in a bronze sleeve 123 which is mounted upon a sheet metal cup member 124 the rear end of which is formed into a spherical portion 125 to form an external spherical surface for co-operating with the bell 126. This member 124 has a cylindrical supporting surface for the bronze sleeve 123 and has a suitable flange 127 by which it is clamped to a flange 128 on the housing 90. A co-operating external cup member 129 bears upon the outer surface of the bell 126 and has a suitable flange 130 by which it is clamped outside of the flange 127 upon the flange 128 of the housing 90.

The driven shaft section 122 has a flange at its forward end 131 to which is secured as by riveting the internal gear and clutch member 110.

A suitable ball bearing 132 has its outer race ring 133 mounted in a cylindrical bore on the inside of said shaft section 122 and has its inner race ring 134 mounted upon the cylindrical end of the shaft 95' to take the radial load upon the said intermediate shaft 95'.

The driven shaft section 122 has longitudinal cylindrical grooves or notches 136 and 137 adapted to receive rollers 138 and 139 mounted upon the ends of the cross pin 140 which cross pin is mounted fixedly in the forward end of the propeller shaft 93. The rollers 138 are preferably spherical in external contour and they fit into the cylindrical grooves 136 and 137 to provide a co-operating bearing between the pin 140 and said shaft section 122 permitting of the required degree of motion between said shaft section and the propeller shaft.

While I have shown the grooves and rollers on the cross pin 140 as one method of securing a universal connection between the shaft section 122 and the propeller shaft 93, it is to be understood that any other preferred mode of connecting the universal joint between said shaft section 122 and the propeller shaft 93 may be employed, such universal joint preferably being disposed inside of the shaft section 122.

It is believed that the operation of this device will be apparent from the foregoing description. The usual accelerating and reverse function is secured through the transmission 88 and the speed range function is secured in the transmission 89. The advantages aforesaid in connection with the embodiment shown in Figs. 1 to 4, inclusive, are inherent in the structure described in connection with said modification.

It is to be noted that the gear and clutch parts are preferably hardened and ground to insure proper fit and proper wearing qualities. The parts 129 and 124 are preferably formed of sheet metal. The part 124 performs the dual function of forming a bearing support for the driven shaft section 122 and also forms the supporting bearing for the inside of the bell 126 at the forward end of the torque tube. The flanges 127 and 130 are centered on the flange 128 by means of a suitable rim 141 which thereby takes the radial load independently of the fastening bolt 142.

Suitable provisions for lubricating the speed range gear is made by a plug 143 at the top and a similar draining plug 144 at the bottom. A suitable opening is formed through the flange 127 as indicated at 145 and the lubricant which is carried up by the internal gear member 110 passes through this opening and through an opening 146 to lubricate the bearing for the driven shaft section 122. At the same time lubrication entering through the hole 145 lubricates the universal joint in the torque tube. Lubricant entering through the bearing 132 reaches the interior of the shaft section 122 to lubricate the universal joint in the propeller shaft.

Figure 7:
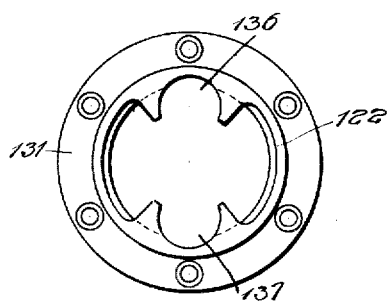
Fig. 7 is a rear elevational view of the hollow shaft section which forms the connection between the internal gear and the propeller shaft.

Whereas, in the form shown in Figs. 1 to 4, inclusive, the addition of the speed range gear adds only 2¾ inches in the case of the Lincoln construction, the structure shown in Figs. 5 to 7, inclusive, adds a greater length to the rear end of the transmission housing 91 in the form in which I have laid out the same. This may be considerably shortened by reducing the length of the pinion sleeve member 100, and it may be further reduced by omitting the ball bearing 98 and depending upon the bearing which is normally furnished on the outside of the sleeve 95 as the Ford car is now made.

In Fig. 8, I have shown a gear suitable for the Chrysler car and cars of that type. In the structure shown in Fig. 8, the accelerating and reverse gear is substantially like that shown in Figs. 1 to 4, and the speed range gear as to its main features is also substantially the same. The driven shaft section, however, in this case being a hollow shaft having two roller bearings in the housing to support the forward end of the universal joint in the propeller shaft. A torque tube is not provided in this case, as the construction shown is adapted for use in the well known Hotchkiss type of drive. The accelerating and reverse gear 150 has a suitable housing shown at 151 having a hollow post or conning tower 152 for mounting the gear shift lever as is well known in the art. At its forward end the housing 150 mounts a driving shaft 153 to which is secured the driving pinion 154 normally meshing with the driven gear 155 and secured on the lay or counter shaft 156. The lay or counter shaft 156 has a bearing at its forward end in the end wall 157 and has a bearing at its rear end in a similar rear end wall 158. The gear 155 is made integral with three other gears, 159, 160 and 161, respectively. The intermediate shaft 162 has its forward end gained into the end of the driving shaft 153 as is understood by those skilled in the art. This shaft is splined throughout the major part of its length. At its forward end the gear and clutch member 163 is adapted to clutch the intermediate shaft 162 to the driving shaft 153 through suitable clutch teeth co-operating with teeth formed on the pinion 154. This gear 163 also has external spur teeth adapted to mesh with the gear 159 at intermediate accelerating speeds. The gear 163 has a suitable clutch collar adapted to be engaged by a shifter fork (not shown). A second shiftable gear 164 is also mounted on the front part of the intermediate shaft 162 and its external spur teeth are adapted to mesh with the gear 160 for first accelerating speed or to mesh with an idler which in turn meshes with the gear 161 for reverse drive.

At its central part, the intermediate shaft 162 has a ball bearing 165 mounted in the end wall 58 of the housing 150.

The outer race of the bearing 165 is held between suitable restraining rings 166 and 167 to maintain the bearing in position.

There is an extension 168 formed on the rear end of the housing 150 which is adapted to be closed by a supplemental housing 169 which is connected thereto by a suitable flange 170.

At its rear end the supplementary housing 169 is closed by a cap or ring 171 and from the end thereof projects the splined end of the driven shaft section 173.

The driven shaft section 173 is mounted in the bearings 174 and 175 located in the extension 169. The rear end of the intermediate shaft 162 is gained into the end of the driven shaft section 173 and bears in the same through the roller bearing 176. This roller bearing 176 is substantially in the same plane as the bearing 174.

A shiftable pinion and clutch member 177 is splined upon the intermediate shaft 162. This pinion and clutch member has an extending hub which provides a suitable grooved shifting collar 178 adapted to receive the ends of the shifter fork 179 which is fastened as by means of the pin 180 upon the rock shaft 181. This rock shaft in turn is connected to a shifter lever 182 controlled by a snap spring and stop such as heretofore described but not shown in the drawings.

The pinion and clutch member 177 has gear teeth 183 adapted to mesh with the gear teeth 184 formed on the inside of the ring gear member 185. The pinion teeth 183 are also adapted to mesh with the clutch teeth 186 formed at the central part of the internal gear and clutch member 187. The internal gear and clutch member 187 has internal gear teeth 188 adapted to be in constant mesh with the teeth 189 formed on the outside of the ring gear member 185. The ring gear member 185 is mounted through a ball bearing 190 eccentrically in the casing, so that the pitch circle of the teeth 184 is tangent to the pitch circle of the teeth 183 on the pinion member 177. At the same time, the pitch circle of the teeth 189 is internally tangent to the pitch circle of the teeth 188.

In the particular embodiment shown, the pinion has 20 teeth and the internal gear on the ring 185 has 24 teeth, giving a reduction of 16.7%. The external gear on the ring 185 has 31 teeth and the internal gear on the member 187 has 35 teeth, giving a second reduction of 11.4%. The total reduction is, therefore, 26.25%.

The inner race 191 of the ball bearing 190 is clamped between a ring 192 which is threaded upon the end of said ring member 185 and the teeth 189 on the outside of said ring 185. The outer race 193 is clamped between a shoulder 194 formed on the extension 168 of the housing, and the adjacent shoulder on the supplementary housing 169. The bore in which the outer race 193 is seated is, as heretofore explained, eccentric with respect to the axis of the shaft 162 and the flange 170 is preferably made similarly eccentric for convenience in manufacture and assembling.

The ring gear may have a groove formed directly upon the outer periphery thereof instead of clamping the inner race 191 as shown.

The internal gear and clutch member 187 is fastened as by means of the rivet 195 and a pilot ring 196 to a flange 197 formed on the forward end of the driven shaft section 173.

A suitable worm 198 is formed upon the shaft section 173 and a worm wheel 199 for the speedometer drive is meshed therewith, this worm wheel 199 being mounted in suitable manner, in said housing section 169.

The bearing 174 is held relatively loosely between the flange 197 on the shaft section 173 and a shoulder 200 formed on the inside of the housing section 169. The shaft section 173 is held against axial movement by the bearing 175, the outer race 201 of which is clamped between a snap ring 202 and an end plate 171. The inner race 203 is clamped between a shoulder 204 on the shaft section 173 and the hub 205 of the coupling member 206 which forms a part of the universal joint and also a mounting for the brake drum 207. This coupling member is held on the shaft section 173 by the splines 172 and is clamped in place endwise by means of the nut 208 threaded upon the end of said shaft section 173.

The operation of a transmission as shown in Fig. 8 is substantially like the modifications previously described.

In Fig. 9 I have shown a modified speed range for use in connection with the Ford automobile in which the treatment of the driven shaft 122' and its connection to the intermediate shaft 95 and to the propeller shaft 93 is substantially the same as shown in Fig. 1 for the Lincoln construction. The intermediate shaft has the central or intermediate bearing 98 in the forward wall of the speed range gear housing and it has the bearing 132 inside the driven shaft section 122', this bearing 132 having the inner race 134 fastened upon the shaft section 95' between a shoulder formed at the end of the spline and a locking nut 210. The outer race 133 is mounted inside of the driven shaft section 122'. The shaft section 95' has an extension 211 which has a cylindrical bearing in the bronze bearing member 212, this bronze bearing member having a spherical outer surface feeding closely in a spherical pocket or socket in the spider ring 213 of the universal joint 214. The bronze bushing 212 is inserted in the vertical socket, as explained in the previous modification, by presenting the narrow spherical edge sidewise and inserting the same through a notch, then turning the bushing 212 into the position shown in Fig. 9.

The driven shaft section 122' has diametrically arranged bearing members 215 which co-operate with bearing pins 216 arranged on the outside of the spider ring 213. Placed at 90° from the pins 216 are pins 217 engaged by suitable bearing members 218 which in turn are fastened upon the opposite arms 219 of the universal joint member 220. This universal joint member 220 has a hub with a flared pocket for receiving the squared end of the propeller shaft 93.

The shaft section 122' and the concentric shaft 95' gain radial support through roller bearings 221 running in an outer race 222 secured in the housing 90. The shaft section 122' is hardened and ground and forms the inner race member co-operating with the rollers 221. The internal gear and clutch member 110 is secured to the driven shaft section 122' by suitable screws, as are shown in the drawings, Fig. 9.

The sheet metal end members 125' and 129' are fastened by their flanges 127 and 130 to the rear end of the housing 90, and form between them a suitable socket for receiving the spherical bell 126 at the forward end of the torque tube 92.

The operation of this form of device will be apparent from the foregoing detailed description.

I prefer, however, to construct the parts as indicated because of the resulting simplicity. The relatively small degree of relative motion between the ring gear and the internal gear is, I find, not objectionable so that these parts may run in constant mesh.

In a chassis construction such as the Studebaker, where the accelerating and reverse gear box is separately mounted on the frame independently of the motor, the speed range gear of my invention is to be located in the usual bell housing directly back of the fly wheel and thus be carried as a part of the motor.

A flexible shaft coupling connects the speed range gear and the accelerating and reverse gear, due to their separate mounting.

My speed range gear may be mounted on the rear axle and satisfactorily operated because it requires only a simple push and pull for its operation. I do not favor such location because the rear axle is subject to the punishment of the road. The speed range gear should be above the springs, for best results.

I do not intend to be limited to the details shown or described.

I claim:

1. In combination, a driving shaft, a driven shaft in line therewith, a pinion gear on one shaft, an internal gear on the other shaft, an eccentric ring gear meshing with both the pinion gear and the internal gear, said pinion gear and said internal gear having co-acting axially engageable clutch parts, and means for shifting one of said gears out of mesh with the ring gear and thereafter causing engagement of said clutch parts.

2. In combination, a driving shaft, an intermediate shaft and a driven shaft all in axial alignment and journalled in stationary bearings, accelerating and reverse gearing, means for connecting said driving shaft with the intermediate shaft either directly or through said accelerating and reverse gearing, a pinion gear and clutch member, an internal gear and clutch member, one of said members being mounted non-rotatably on the intermediate shaft and the other member being mounted non-rotatably on the driven shaft, a gear ring eccentrically mounted an external anti-friction bearing for said gear ring, said ring having internal teeth meshing with the pinion member and external teeth meshing with the internal gear member and means for moving one of said gear members out of mesh with the ring gear and into clutching engagement with the other gear member for direct drive between the intermediate and driven shafts.

3. In combination, a driving shaft, a driven shaft and an intermediate shaft journalled axially in the ends of said other shafts, stationary bearings for the adjacent ends of the driving shaft and driven shaft, accelerating and reverse gearing for connecting the driving and intermediate shafts, speed range gearing for connecting the intermediate shaft and the driven shaft, a bearing for the intermediate shaft between said accelerating and reverse gearing and said speed range gearing and a common frame work for supporting all of said bearings rigidly in place.

4. In combination, a gear housing, a driving shaft at one end of the housing having a stationary bearing, a driven shaft at the opposite end of the housing having a stationary external bearing and an intermediate shaft piloted in the ends of the driving and driven shafts, an intermediate bearing for the intermediate shaft, accelerating and reverse gearing between said first bearing and the intermediate bearing, said accelerating and reverse gearing comprising a plurality of external gears, and a speed range gearing between the intermediate shaft and the driven shaft disposed between the intermediate bearing and said second-named bearing, said speed range gearing comprising a plurality of internal gears and external gears meshing with said internal gears, a sleeve bearing one of said internal gears, said sleeve having an external anti-friction bearing.

5. In combination, a housing having a front end wall, a bearing in the front end wall, a driving shaft in the bearing, a rear end wall, a driven shaft having a bearing in the rear end wall, an intermediate wall, a bearing in the intermediate wall and an intermediate shaft axially in alignment with and piloted on the driving and driven shafts and being journaled in said last-named bearing, accelerating and reverse gearing lying between the first and third bearings for connecting the drive shaft and the intermediate shaft, a speed range gearing lying between the third bearing and the second bearing for connecting the intermediate shaft to the driven shaft, said speed range gearing comprising a shiftable pinion on the intermediate shaft, an internal gear fixed on the driven shaft and having a clutch socket and an eccentric gear ring connecting the pinion and internal gear said eccentric gearing having an external anti-friction bearing, said eccentric gear ring also having external teeth meshing with the internal gear and internal teeth for meshing with the pinion and said pinion being shiftable from meshing position with the internal teeth on the ring gear to engagement with the clutch socket in the internal gear, and vice versa.

6. In a device of the class described, a housing an intermediate shaft and a driven shaft, a journal for the forward end of the intermediate shaft, a rear end of the intermediate shaft being journalled in the driven shaft, a bearing between the forward end of the driven shaft and the housing, a universal joint connected to the rear end of the driven shaft, an internal gear and clutch member connected to the forward end of the driven shaft, an eccentric ring gear meshing with the internal gear, a pinion slidably keyed on the intermediate shaft adapted to mesh with the ring gear and to clutch the internal gear and clutch member, a rock shaft horizontally disposed above the intermediate shaft, a shifter fork connected to the rock shaft for shifting said pinion, manual means for operating the rock shaft, and a spring for throwing the rock shaft to one extreme position and the other for meshing the pinion with the ring gear and for engaging the same with the clutch of the internal gear.

7. In combination, a driven shaft section, a universal joint connected to the end of the driven shaft section, said universal joint having a ring member, a driving shaft projecting into the ring member and having a bearing with said ring member permitting universal movement, an internal gear and clutch member connected to the driven shaft section, a pinion slidably mounted on the driving shaft and adapted to drive the internal gear and means for clutching the pinion to the internal gear for direct drive.

8. In combination, a driving shaft, a driven shaft section, a propeller shaft, a universal joint disposed on said driven shaft section for connecting the same with the propeller shaft, a bearing between the front end of said shaft section and the rear end of the driving shaft, a pinion on the driving shaft, an internal gear and clutch member on the driven shaft section and means for connecting said pinion and internal gear for a gear reduction and for connecting them together for direct drive.

9. In combination, a driving shaft, a driven shaft section, a propeller shaft, a housing having a bearing for the driven shaft section, a universal joint for the propeller shaft disposed within the driven shaft section, a pinion splined on the driving shaft, an internal gear and clutch member connected to the driven shaft section and means for connecting the pinion and internal gear member for a gear reduction and for direct drive.

10. In a speed range gear of the class described, a housing having a forward wall, the front end of the housing being adapted to be clamped to the usual automobile transmission, an intermediate shaft forming an extension of the driving shaft in said usual housing, an end member having a flange clamped to the rear end of the housing member and providing a support for a bearing, a bearing in said support, a driven shaft section in said bearing, a propeller shaft having a universal joint mounted inside of said driven shaft section and supported by said bearing and means comprising an internal gear and a pinion for connecting said intermediate shaft and said driven shaft section.

11. In combination, a chassis having a frame, a motor mounted in the forward part of the frame, an accelerating and reverse gear box of the shiftable spur gear type independently mounted in the frame, a clutch at the rear of the motor, a shaft connected to the clutch, a shaft section maintained at all times axially in line with the clutch shaft and coupled to the gear box, and a speed range gearing comprising an internal gear having a clutch socket, a ring gear having external teeth meshing with said internal gear and internal teeth, and a pinion shiftable from meshing engagement with the internal teeth on the ring gear to engagement with said clutch socket, and vice versa.

12. In combination, a driving member, an intermediate shaft, an accelerating and reverse transmission for connecting the said driving member to and from the intermediate shaft, a propeller shaft, a pinion gear non-rotatably mounted on one shaft, an internal gear non-rotatably mounted on the other shaft, said gears having cooperating clutch parts for clutching the shafts together, an eccentric ring gear meshing with both the pinion and internal gear and means for moving one of said gears axially out of mesh with the ring gear and for engaging said cooperating clutch parts.

13. In a transmission, the combination of a driving shaft having a low speed pinion, a lay shaft having a low speed gear in constant mesh with the pinion and having a low speed pinion, a driven shaft having an internal gear, an intermediate shaft axially alined with the driving and driven gear, clutching the drive shaft to the intermediate shaft and the intermediate shaft to the driven shaft to transmit direct drive on a straight run at engine speed through the transmission, a sleeve member surrounding the intermediate shaft and having an internal gear at the end which is nearest the drive shaft and an external gear at the end nearest the driven shaft, a pinion driven by the intermediate shaft, said sleeve member being eccentrically mounted to maintain the internal gear teeth in position to cooperate with said latter pinion, and the external gear teeth to cooperate with the teeth of the internal gear on the driven shaft, and change spur gears driven by the lay shaft to provide a low speed drive for said driven shaft.

14. In a transmission, a driving shaft bearing a pinion, a driven shaft bearing an internal gear, said driving shaft being piloted into the driven shaft and journaled in axial alinement therewith, an eccentrically mounted sleeve member embracing the drive shaft and having internal teeth for cooperation with the pinion and external teeth spaced axially from the internal teeth for cooperating with the internal gear, said pinion being shiftable for selectively driving at a gear reduction through the pinion, the sleeve, and the internal gear, or clutching the driving shaft directly to the driven shaft for a direct drive.

15. In a transmission, a housing, a driving shaft, a driven shaft in axial alignment therewith, said driving shaft having a pilot bearing in the adjacent end of the driven shaft, said driven shaft having a clutch socket adjacent the pilot bearing and having an internal gear overhanging a portion of the driving shaft, an anti-friction bearing in the housing supporting the driven shaft where it joins the internal gear, and an anti-friction bearing in the housing for the remote end of the driven shaft, a pinion embracing the driving shaft and shiftable into and out of clutching engagement with said clutch socket, said driving shaft having splines for driving said pinion, a sleeve embracing said pinion and driving shaft and extending within said internal gear, anti-friction bearings in the frame for eccentrically journaling the sleeve intermediate its ends, said sleeve having internal teeth at one end cooperating with the teeth of the pinion and having external teeth at the other end cooperating with the teeth of the internal gear, said transmission being organized to drive the driven shaft from the drive shaft selectively either through the two sets of gear teeth at a gear reduction or directly through said clutch socket.

16. In combination, a gear case, driving and driven shafts journaled in the gear case and piloted into each other and having external bearings in said gear case, one shaft having a slidable pinion splined thereupon, a sleeve journaled eccentrically with respect to said shafts, said sleeve having at one end internal gear teeth adapted to mesh with the pinion, a gear rigid on the other shaft, the sleeve having at its other end gear teeth constantly in mesh with said gear, and cooperating means on said gear and pinion for clutching said parts together for direct drive, said slidable pinion being longitudinally shiftable from meshing position with the internal teeth on the sleeve to clutching position with the gear.

17. A change speed gear transmission comprising, in combination, a driving shaft, a driven shaft, an intermediate driven shaft, said shafts being in coaxial relation, counter-shaft gears adapted to be driven by the driving shaft, gears on the intermediate driven shaft adapted to be driven by the counter-shaft gears, said gears being arranged for selective connection for effecting speed changes, an internal-external gear unit mounted to rotate about the intermediate driven shaft eccentric thereto, a gear splined on the intermediate driven shaft and shiftable for selective connection either with said internal gear or for direct connection with the driven shaft, an internal gear fixed to the driven shaft and meshing with said external gear, and means for directly connecting the driving shaft to the intermediate driven shaft.

18. A transmission for motor vehicles comprising, in combination, a driving and a driven shaft in spaced coaxial relation, an intermediate driven shaft journaled at its ends in said driving and driven shafts, counter-shaft gears adapted to be driven from the driving shaft, gears on the intermediate driven shaft adapted for selective connection with the countershaft gears, means for directly connecting the driving shaft and the intermediate driven shaft, an internal-external gear unit, and means for selectively connecting the intermediate driven shaft and the driven shaft either through said internal-external gear unit or direct.

19. A change speed gear transmission for motor vehicles including change speed gearing terminating in a shiftable driven gear, a driven shaft, and gearing between said driven gear and driven shaft comprising an internal-external gear unit, an internal gear on the driven shaft in mesh with said external gear, and means for selectively connecting said driven gear either to the internal gear of said gear unit or the driven shaft.

20. A gear set for motor vehicles having, in combination, a driving shaft and a driven shaft, each independently journaled, an intermediate driven shaft journaled at its ends in the driving and driven shafts, change speed gearing operable between the driving shaft and the intermediate driven shaft for selective transmission of different speeds, an internal-external gear unit journaled to rotate about the intermediate driven shaft eccentric thereto, a gear on the driven shaft meshing with the external gear, and means including a gear splined on the intermediate driven shaft and shiftable thereon for selective connection either with said internal gear or direct with the driven shaft.

THOMAS L. FAWICK.

CERTIFICATE OF CORRECTION.

Patent No. 1,946,154.  February 6, 1934.

THOMAS L. FAWICK.

It is hereby certified that error appears in the printed specification of the above numbered patent requiring correction as follows: Page 8, line 70, claim 13, before "clutching" insert the word means; and that the said Letters Patent should be read with this correction therein that the same may conform to the record of the case in the Patent Office.

Signed and sealed this 13th day of March, A. D. 1934.

F. M. Hopkins (Seal)  Acting Commissioner of Patents.

termediate driven shaft and shiftable for selective connection either with said internal gear or for direct connection with the driven shaft, an internal gear fixed to the driven shaft and meshing with said external gear, and means for directly connecting the driving shaft to the intermediate driven shaft.

18. A transmission for motor vehicles comprising, in combination, a driving and a driven shaft in spaced coaxial relation, an intermediate driven shaft journaled at its ends in said driving and driven shafts, counter-shaft gears adapted to be driven from the driving shaft, gears on the intermediate driven shaft adapted for selective connection with the countershaft gears, means for directly connecting the driving shaft and the intermediate driven shaft, an internal-external gear unit, and means for selectively connecting the intermediate driven shaft and the driven shaft either through said internal-external gear unit or direct.

19. A change speed gear transmission for motor vehicles including change speed gearing terminating in a shiftable driven gear, a driven shaft, and gearing between said driven gear and driven shaft comprising an internal-external gear unit, an internal gear on the driven shaft in mesh with said external gear, and means for selectively connecting said driven gear either to the internal gear of said gear unit or the driven shaft.

20. A gear set for motor vehicles having, in combination, a driving shaft and a driven shaft, each independently journaled, an intermediate driven shaft journaled at its ends in the driving and driven shafts, change speed gearing operable between the driving shaft and the intermediate driven shaft for selective transmission of different speeds, an internal-external gear unit journaled to rotate about the intermediate driven shaft eccentric thereto, a gear on the driven shaft meshing with the external gear, and means including a gear splined on the intermediate driven shaft and shiftable thereon for selective connection either with said internal gear or direct with the driven shaft.

THOMAS L. FAWICK.

CERTIFICATE OF CORRECTION.

Patent No. 1,946,154.  February 6, 1934.

THOMAS L. FAWICK.

It is hereby certified that error appears in the printed specification of the above numbered patent requiring correction as follows: Page 8, line 70, claim 13, before "clutching" insert the word means; and that the said Letters Patent should be read with this correction therein that the same may conform to the record of the case in the Patent Office.

Signed and sealed this 13th day of March, A. D. 1934.

F. M. Hopkins (Seal)  Acting Commissioner of Patents.